Figure 4:
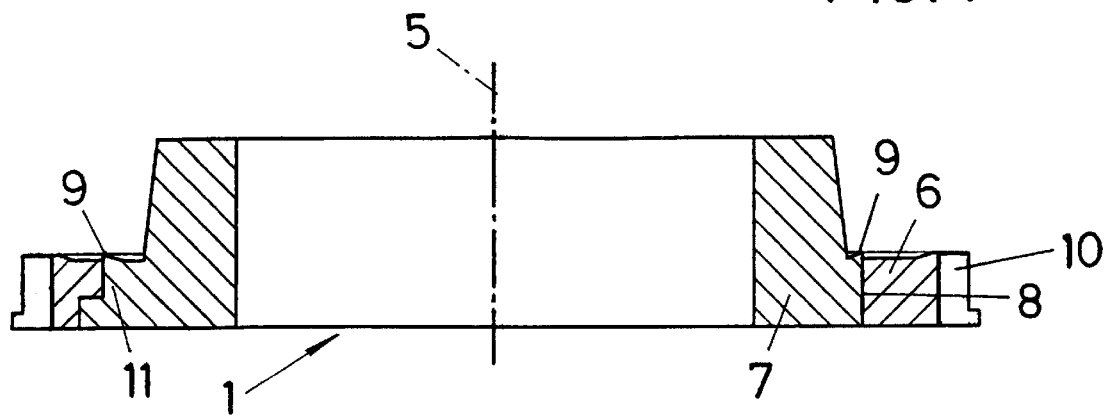

United States Patent
Grundner et al.

[11] Patent Number: 6,090,320
[45] Date of Patent: Jul. 18, 2000

[54] METHOD OF PRODUCING A SINTERED BODY

[75] Inventors: Alois Grundner, Eberstalzell; Karl Derflinger, Laakirchen, both of Austria

[73] Assignee: Miba Sintermetall Aktiengesellschaft, Laakirchen, Austria

[21] Appl. No.: 08/982,549

[22] Filed: Dec. 2, 1997

[30] Foreign Application Priority Data

Dec. 4, 1996 [AT] Austria .................................. 711/96 U

[51] Int. Cl.[7] .................................................. B29C 67/04
[52] U.S. Cl. ...................... 264/113; 264/125; 156/89.11; 156/308.2
[58] Field of Search .................... 264/113, 125; 156/89.11, 293, 308.2

[56] References Cited

U.S. PATENT DOCUMENTS

| | | | |
|---|---|---|---|
| 3,948,364 | 4/1976 | Lowey | 188/251 R |
| 4,415,363 | 11/1983 | Sanftleben et al. | 75/229 |
| 4,524,046 | 6/1985 | Suganuma et al. | 419/8 |
| 4,914,743 | 4/1990 | Gramberger et al. | 156/89.11 |
| 4,952,199 | 8/1990 | Saka et al. | 474/152 |
| 5,032,335 | 7/1991 | Wilson | 264/113 |
| 5,143,192 | 9/1992 | Vojacek et al. | 192/107 M |

*Primary Examiner*—Janh Silbaugh
*Assistant Examiner*—Stefan Staicovici
*Attorney, Agent, or Firm*—Collard & Roe, P.C.

[57] ABSTRACT

A method of producing a sintered body (1) having different cross-sections along a main axis (5), in particular a toothed-belt or chain wheel, by compression moulding a sintering powder in the direction of the main axis (5) and subsequent sintering. At least two partial bodies (6, 7), which can be form-fitted into each other in the direction of the main axis (5), are pressed from sintering powder, which partial bodies each form an axial portion of the sintered body (1) with different cross-sections, and that the separately pressed and possibly presintered partial bodies (6, 7) are jointly sintered after joining them together.

7 Claims, 2 Drawing Sheets

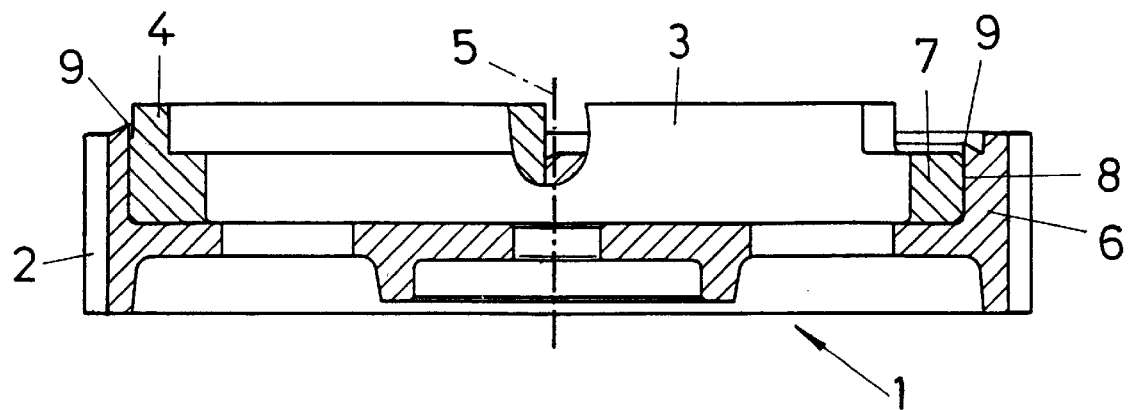
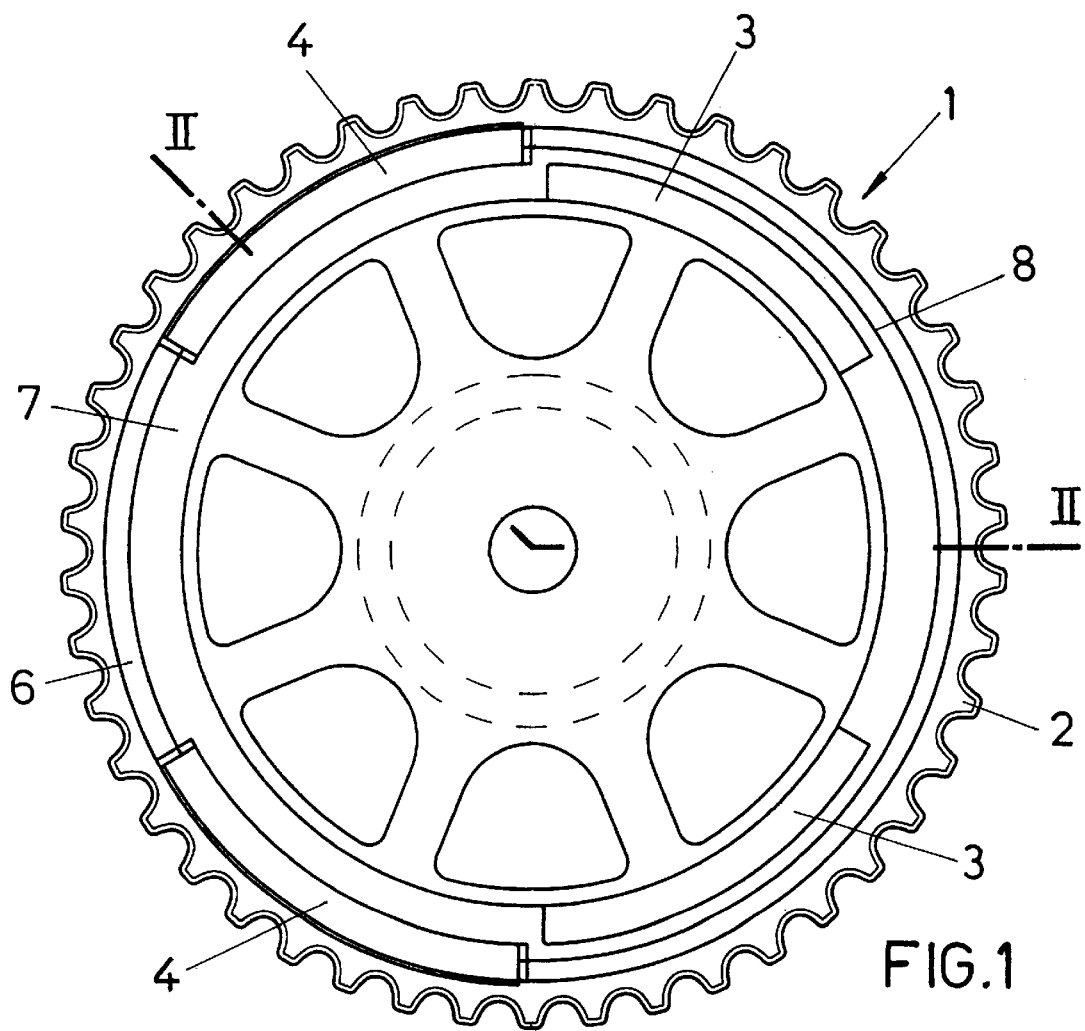

METHOD OF PRODUCING A SINTERED BODY

This invention relates to a method of producing a sintered body having a different cross-sectional configuration at different locations along a main axis, in particular a toothed-belt or chain wheel, by compression moulding a sintering powder in the direction of the main axis and subsequent sintering.

Toothed-belt or chain wheels having for instance on one side inside their external toothing axially protruding segments distributed over the periphery, which are used as pulse generators for the drive control, require comparatively expensive pressing tools for manufacturing them from a sintering powder, because the different cross-sections obtained over the axial extension of these toothed-belt or chain wheels necessitate corresponding divisions of the punches. Despite the use of such expensive pressing tools increased requirements with respect to the dimensional accuracy, in particular with respect to the concentricity and the angular accuracy of the toothing, cannot be satisfied without a mechanical treatment of the sintered body. The nonuniform distribution of masses as a result of the different cross-sections along the main axis complicates the uniform compression of the sintering powder, which leads to a nonuniform density distribution, which in turn has a disadvantageous effect on the dimensional accuracy of the sintered body.

It is therefore the object underlying the invention to eliminate these deficiencies and create a method of producing a sintered body, in particular a toothed-belt or chain wheel as described above such that the sintered bodies can be sintered with sufficient accuracy without subsequent mechanical treatment.

This object is solved by the invention in that at least two partial bodies, which can be form-fitted into each other in the direction of the main axis, are pressed from a sintering powder, which partial bodies each form an axial portion of the sintered body with different cross-sectional configuration, and that the separately pressed and possibly presintered partial bodies are jointly sintered after having been joined together.

By dividing the moulded body into at least two partial bodies, which each form an axial portion of the moulded body, the difficulties otherwise encountered when pressing the moulded body can be eliminated, because as compared to the entire moulded body the partial bodies have a simpler geometrical shape and therefore a more favorable mass distribution, so that advantageous conditions for a uniform compressibility are obtained. The improved uniform density distribution then directly leads to a good dimensional accuracy of the moulded body composed of the partial bodies prior to sintering. The pressed partial bodies can at best be joined together after presintering them to improve their handling properties and then be jointly sintered, namely preferably with a temporary liquid phase, so as to ensure a good sinter connection between the partial bodies. Apart from the fact that by composing the moulded body of two partial bodies of a geometrically simpler shape the manufacturing tolerances can be decreased considerably for the above described reasons, the inventive method also leads to simpler pressing tools, because merely the geometrically less complex partial bodies have to be pressed from sintering powder.

To achieve a connection of the partial bodies beyond the sinter connection, the jointly sintered partial bodies can in addition be connected mechanically by caulking or beading corresponding peripheral portions. For this purpose, the partial bodies may be provided with suitable peripheral portions, which after a mechanical shaping engage over the respectively other partial body. The mutual connection of the partial bodies can additionally be supported by a different radial shrink behaviour of the partial bodies. To this end, the partial bodies must be pressed from different sintering powders, so that during the sintering process the inner partial body existing after the axial joining of the pressed partial bodies has less radial shrinkage than the other partial body surrounding this partial body. The use of different sintering powders for the production of the individual partial bodies may in addition be utilized for achieving different material properties. In the case of the production of a toothed-belt or chain wheel the axially protruding, segment shaped pulse generators associated to the one partial body may have special magnetic properties, while the other partial body having the gear rim has a high abrasion resistance.

Figure 3:
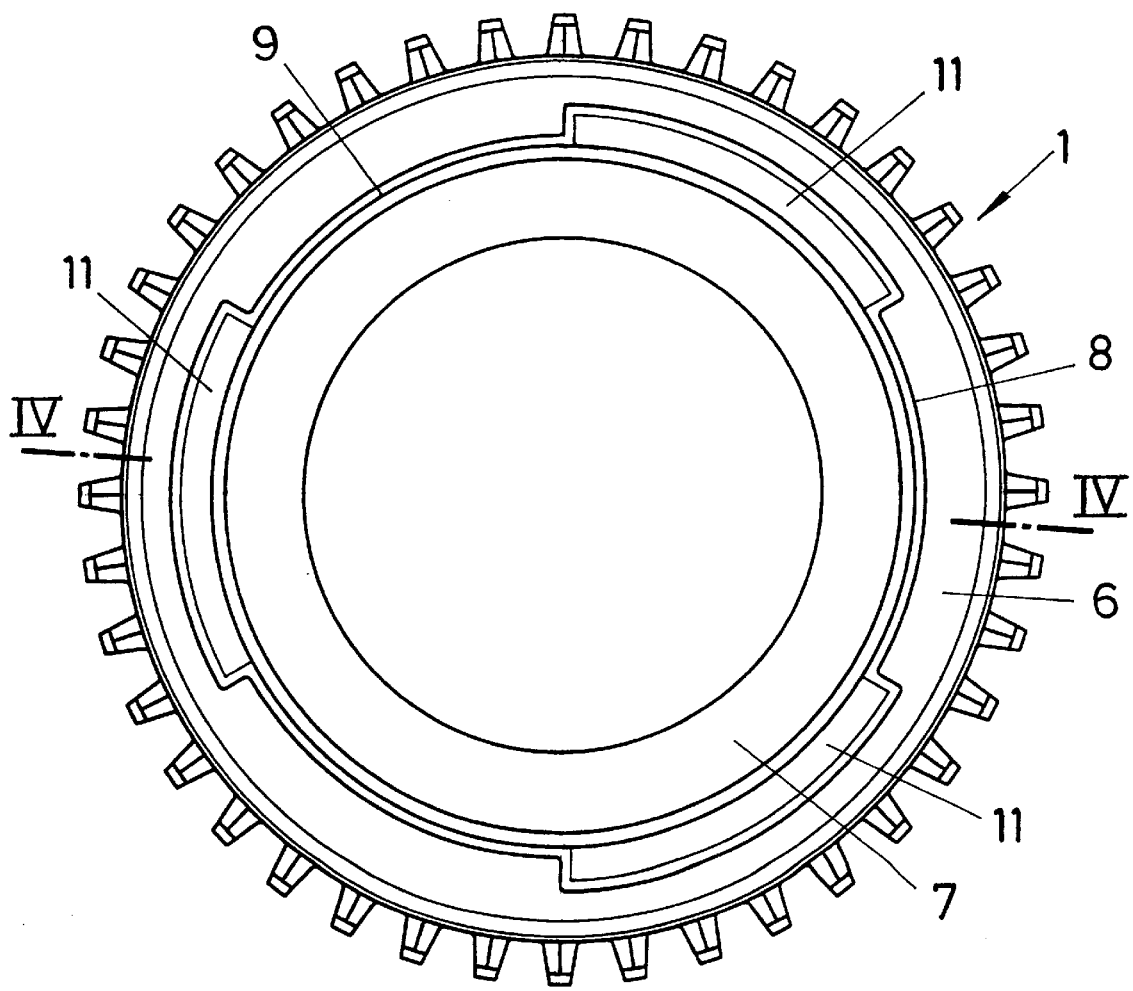

The method in accordance with the invention will now be explained in detail with reference to the drawing, wherein:

FIG. 1 shows a toothed-belt wheel made in accordance with the invention in a simplified top view of the side of the pulse generator, FIG. 2 shows this toothed-belt wheel in a section along line II—II of FIG. 1, FIG. 3 shows a top view of a gear rim provided with a friction cone, and FIG. 4 shows a section along line IV—IV of FIG. 3.

The toothed-belt wheel shown in FIGS. 1 and 2 forms a sintered body 1, which inside an external gear rim 2 has axially protruding segments 3 and 4 as pulse generators for the drive control, where the segments 3 and 4 are radially offset with respect to each other, so that for the entire sintered body 1 a comparatively complex geometrical shape with different cross-sectional configuration along its main axis 5 is obtained. To overcome the difficulties resulting from these different cross-sectional configuration with respect to pressing such sintered body 1 from a sintering powder, the moulded body 1 is divided into two partial bodies 6 and 7. The division has been made such that the axially protruding segments 3 and 4 are associated to the ring-shaped partial body 7, while the actual toothed-belt wheel is formed by the partial body 6, into which the partial body 7 has been form-fitted in an axial recess 8, as this can be taken in particular from FIG. 2.

The two partial bodies 6 and 7 thus have a much simpler geometrical shape as compared to the composite moulded body 1, which considerably facilitates the compression moulding of these partial bodies 6 and 7 from sintering powder. Due to the more uniform mass distribution, the partial bodies 6 and 7 can be pressed and fitted into each other with a uniform density distribution while maintaining small tolerances, in order to be subsequently jointly sintered for instance at a temperature of 1100 to 1250° C. with a temporary liquid phase. The separate compression moulding of the partial bodies 6 and 7 not only leads to a substantially improved dimensional accuracy of the sintered body 1, which thus requires no expensive mechanical finishing, but also provides for the use of different sintering powders, so as to advantageously correspond to the respective locally different material requirements. The partial body 7 can accordingly be pressed from a soft magnetic sintering powder favorable for the function of the pulse generator, but the partial body 6 can be pressed from a sintering powder having a high mechanical strength. After sintering, the sintered body 1 may conventionally be subjected to a sizing process.

To achieve a connection of the two partial bodies 6 and 7 beyond the sinter connection, the partial body 6 may be provided with peripheral portions 9 axially protruding beyond the partial body 7, which peripheral portions are beaded against the partial body 7 after jointly sintering them. In FIG. 2 the peripheral portions 9 are represented in the starting position prior to beading.

In accordance with the embodiment shown in FIGS. 3 and 4, the sintered body 1 forms an external gear rim 10 provided with a friction cone, which external gear rim surrounds as partial body 6 the cone ring axially protruding beyond the external gear rim 10 as other partial body 7. The partial body 7 is provided with three radially protruding shoulders 11, which engage in corresponding recesses of the partial body 6. The two partial bodies 6 and 7 are again pressed separately from different sintering powders, so as to be able to subsequently join together the pressed parts and jointly sinter them. The possible additional caulking of the sintered partial bodies 6 and 7 is illustrated by the peripheral portions 9 of the partial body 7 in accordance with FIG. 4. By bending these peripheral portions 9 towards the partial body 6, they engage over the same, and it is in addition held against an axial displacement.

What is claimed is:

1. A method of producing without subsequent mechanical treatment a composite sintered body having different cross-sectional configurations and different dimensions at different locations along a main axis and good dimensional accuracy by compression molding a sintering powder in the direction of the main axis and subsequently sintering, comprising the steps of:

(a) compression molding from a sintering powder at least two partial bodies, each one of the partial bodies having a simpler geometric shape than the composite sintered body and improved uniform density distribution and forming a different axial portion of the sintered body, the partial bodies being shaped so that they may be form-fitted into each other in the direction of the main axis, (b) form-fitting the separately compression molded partial bodies into each other in the direction of the main axis to join them, and (c) jointly sintering the joined partial bodies to produce the composite sintered body.

2. The method of claim 1, comprising the further step of presintering the separately compression molded partial bodies before they are jointly sintered.

3. The method of claim 1, comprising the further step of additionally mechanically connecting the jointly sintered partial bodies.

4. The method of claim 3, wherein the jointly sintered partial bodies are mechanically connected by caulking.

5. The method of claim 3, wherein the jointly sintered partial bodies are mechanically connected by beading peripheral portions.

6. The method of claim 1, wherein the partial bodies are compression molded from differing sintering powders.

7. The method of claim 1, wherein the sintered body is a toothed-belt or chain wheel.

* * * * *